May 31, 1960     M. C. CHRISTENSEN     2,938,244

COMBINED ANTI-ROOSTING AND SCARE CROW DEVICE

Filed April 30, 1958

INVENTOR.
MARIE C. CHRISTENSEN

United States Patent Office 2,938,244
Patented May 31, 1960

2,938,244

COMBINED ANTI-ROOSTING AND SCARE CROW DEVICE

Marie C. Christensen, Ambler, Pa.; 843 Cameron St., Philadelphia, Pa.

Filed Apr. 30, 1958, Ser. No. 731,946

1 Claim. (Cl. 20—1)

Birds roosting on building eaves and ledges, on bridge abutments, cables, and other structures, create serious problems in urban communities, from the standpoint of noise as well as of dirt.

Strenuous and extensive efforts, such as shooting, trapping, and poisoning, etc., have met with no appreciable success.

It is, therefore, one object of my invention to produce a device which can be easily applied to a ledge, cable, or other structure to be protected and which will effectively prevent birds from roosting on the protected structure.

A further object of the invention is to provide a device of this type which is inexpensive to make and one which has no maintenance costs.

Birds attacking fruit trees also create a serious problem, especially in suburban areas where fruit trees are few and where the concentration of birds is heavier than it is in rural farming areas.

It is, therefore, a still further object of the invention to produce a device of the type set forth which will also serve as a scare crow to protect fruit trees or other outdoor areas.

The full nature of the invention will be understood from the following specification and the accompanying drawings in which.

Figure 1:
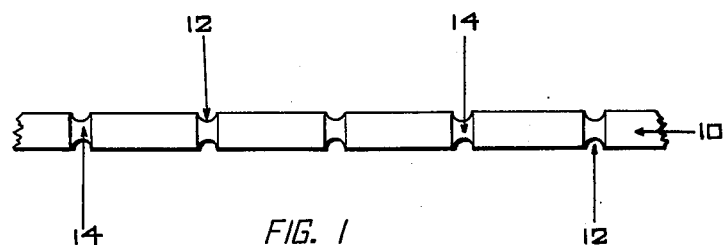
Fig. 1 is a fragmentary side elevational view of one of two parts used in carrying out my invention.
Figure 2:
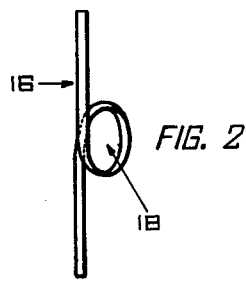
Fig. 2 is an enlarged side elevational view of the other part.

The combined anti-roosting and scare-crow device illustrated includes an elongated rigid member 10 which is made of light, corrosion resisting material, such as aluminum rod, and is provided with spaced notches 12 which produce reduced sections 14 which serve as bearings for strips 16 which, as will be shown below, prevent the birds from roosting and scare them off altogether thus protecting the ledge to which the device is applied from bird droppings. Strips 16 are made of light, thin, sheet material which is corrosion resisting and which is flexible but form retaining. In practice, strips 16 can be cut from sheets of light gauge sheet aluminum and are twisted, approximately as shown in Fig. 2, to form loops or eyes 18 the diameter of which is larger than the diameter of reduced bearing portions 14 so that strips 16 will be free to rotate about the axis of rigid member 10. It will be understood that the strips are confined against longitudinal movement relative to said member by their respective notches 12.

Figure 3:
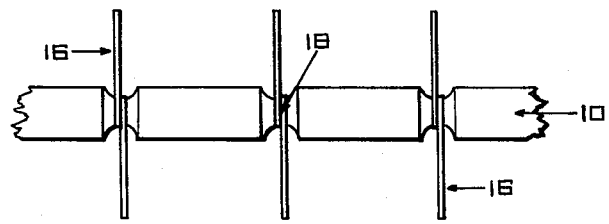
Fig. 3 is a diagrammatic side elevational view of the device embodying the invention.

As shown in Fig. 2 strips 16 are wider than they are thick and that, when applied to rigid support 10, the wide surfaces of the strips extend longitudinally of the support 10 so that wind moving in a direction to the axis of the support, or as shown by the phantom arrows in Fig. 3, will push against the wide sides of the strips and make them rotate rapidly enough to scare off the birds and disabuse them of any idea of roosting, which they may have entertained. In other words, the flat sides of the strips serves as sails, or as the arms of a windmill.

The spacing of strips 16 from each other will vary according to the use to which the device is to be put. For example, if small birds, such as sparrows, and wrens, are to be kept off, the notches and the strips will be made closer together. Conversely, if the device is to be used for keeping larger birds off, such as pigeons, the strips will be located further apart, and so on.

In practice a member 10, either in one long piece, or in sections, is suitably secured adjacent the ledge, cable or other structure to be protected and is spaced therefrom to permit free rotation of strips 16. Since the various structures on which birds tend to roost are generally high, there usually is enough wind to cause the strips to rotate partially, or wholly, in one direction or the other. This, as stated, acts as a scare-crow and serves to keep birds from even attempting to alight on the strips or in their vicinity. If an adventurous bird tries to alight on one of the strips, the resulting imbalance will cause the strip to rotate and will launch the bird back into the air. In other words, the actions of the strips, be it due to wind, or to an attempt of a bird to alight thereon, effectively scares the birds away.

The manner in which the device of Fig. 3 is attached to a building ledge, to a bridge, a cable, etc., has not been shown because it will vary with various installations and because it is not necessary to enable others to practice the invention. It is enough to say that any suitable brackets or arms or yokes can be attached to the particular structure to be protected, it being merely necessary to space the member 10 from the structure far enough to permit free rotation of strips 16.

By mounting the device on poles, or on a trellis like structure, so as to span the top and sides of a tree, the birds will be discouraged from eating the fruit on the tree.

Instead of aluminum, or other metal, it is within the scope of my invention to use any available light and sufficiently rigid synthetic material.

In order to make the device inconspicuous, it can be colored so as to camouflage it or so as to make it harmonize with the particular structure in connection with which it is to be used.

The drawings, and particularly Fig. 3, are intended to be illustrative and are not to scale. In practice, the thickness, the length of member 10 and the length and width of rotary strips 16, will be determined according to requirements. For example, when member 10 is used in short sections, it can be made of much lighter stock, and vice versa.

While I prefer to mount strips 16 in notches 12, it is within the scope of the invention to use split nuts or clamps which are attachable to the elongated member to space and to prevent longitudinal movement of the strips relative to the longitudinal member.

What I claim is:

A combined scare crow and anti-roosting device including an elongated rigid support, there being spaced notches producing reduced bearings, spaced along said support, a strip loosely rotatable about each of said bearings and extending in opposite directions beyond said support, each of said strips being rectangular in cross-section and being so mounted on its bearing that the planes of the wide sides of said strips are substantially parallel to a plane passing longitudinally of the axis of said support.

References Cited in the file of this patent

UNITED STATES PATENTS

| 251,276 | Olsen | Dec. 20, 1881 |
| 261,703 | Haish | July 25, 1882 |
| 2,308,893 | Pavloff et al. | Jan. 19, 1943 |